UNITED STATES PATENT OFFICE.

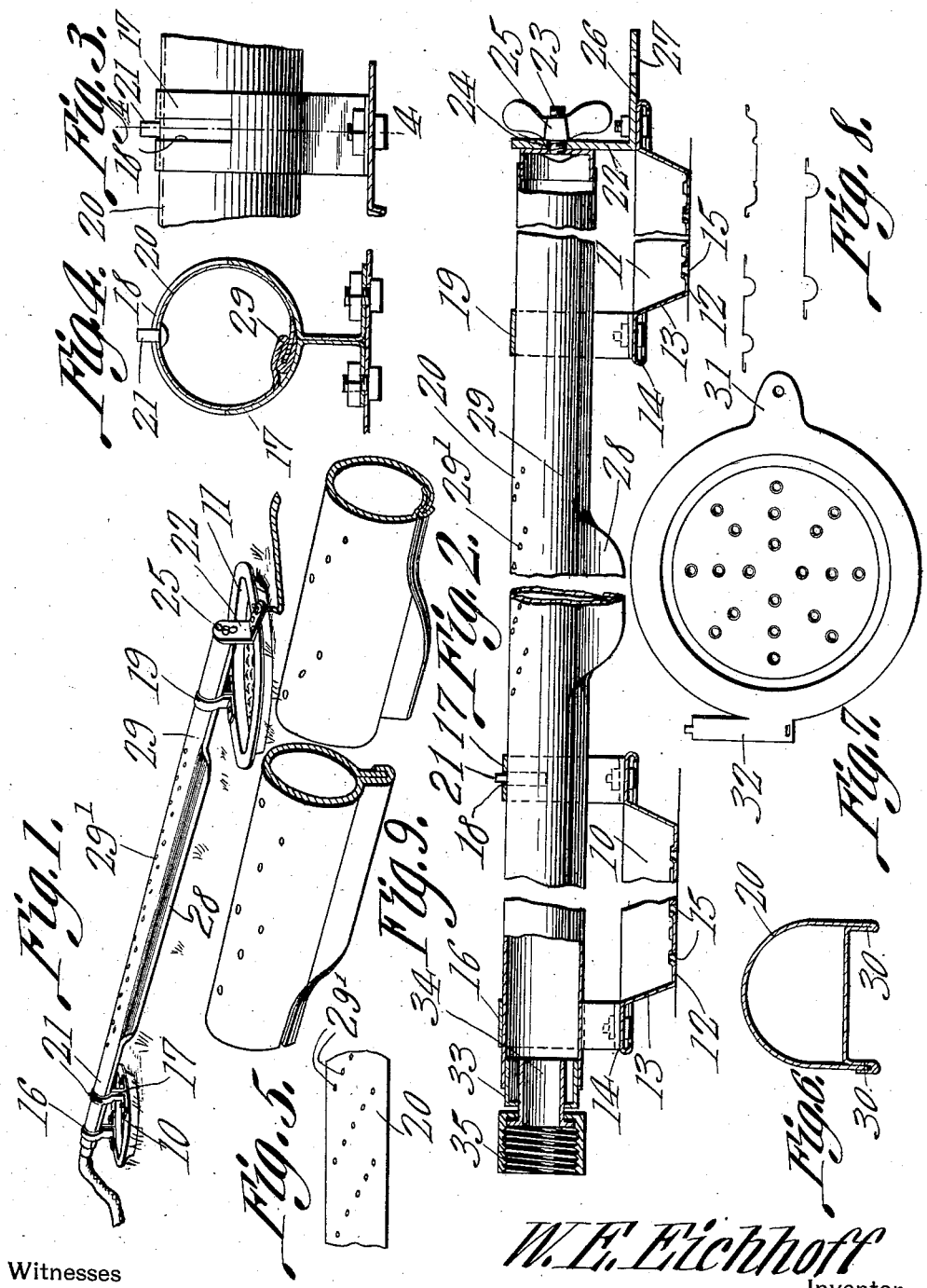

WALTER ELLSWORTH EICHHOFF, OF SOUTH PASADENA, CALIFORNIA.

LAWN-SPRINKLER.

1,068,872.  Specification of Letters Patent.  Patented July 29, 1913.

Application filed November 23, 1910. Serial No. 593,878.

*To all whom it may concern:*

Be it known that I, WALTER E. EICHHOFF, a citizen of the United States, residing at South Pasadena, in the county of Los Angeles and State of California, have invented a new and useful Lawn-Sprinkler, of which the following is a specification.

This invention relates to lawn sprinklers, one of its objects being to provide a device of this character in the form of a perforated pipe supported at its ends for angular adjustment upon bases designed to contact with the ground, there being improved means carried by the pipe and brackets for holding the pipe in any position to which it may be adjusted angularly.

With the above and other objects in view, the invention resides in the general construction and arrangement of parts set forth in the appended claim and illustrated in the accompanying drawings, in which—

Figure 1 is a perspective view of the device. Fig. 2 is a view partly in elevation and partly in longitudinal section, of the device. Fig. 3 is a detail view in elevation of a portion of the device, this view illustrating the means for limiting the angular adjustment of the sprinkler pipe. Fig. 4 is a vertical section view on the line 4—4 of Fig. 3. Fig. 5 is a top plan view of a portion of the sprinkler pipe showing the arrangement of the perforations therein. Fig. 6 is a cross sectional view through a modified form of sprinkler pipe. Fig. 7 is a top plan view of a modified form of base for supporting the pipe, the same being shown in condition prior to mounting of the pipe thereon. Fig. 8 is a duplicate view illustrating other forms of bases for supporting the pipe. Fig. 9 is an enlarged perspective view of a portion of the perforated pipe.

In the drawings, the sprinkler is illustrated as embodying spaced bases one indicated by the numeral 10 and the other by the numeral 11. While the bases, in themselves, are identical in construction, the brackets on the bases for supporting the sprinkler pipe differ in construction. Each base proper comprises a flat circular bottom 12 having an upstanding peripheral flange 13 formed at its upper edge with an outstanding flange 14. The bottom 12 of each base is formed with a number of perforations 15 preferably formed by indenting the under side of the bottom. As a consequence, the openings 15 taper upwardly and the passage of the base over the surface of the lawn to be sprinkled, is not interfered with. While the bases 10 and 11 are preferably constructed as above described and as shown in Figs. 1 and 2 of the drawings, they may have their bottoms formed with rounded projections or with indentations as shown in the several views of Fig. 8. It will be readily understood at this point that by forming the bottom 12 of each base with perforations, ventilation is provided for beneath the bottom of the base and consequently the portion of the lawn upon which the base rests, will not be burned by the base when said base is heated by the sun.

Secured upon the base 10 is an upstanding bracket 16 and also fixed upon the base at a point diametrically opposite the bracket 16 is a second bracket 17 formed with a slot 18 extending circumferentially thereof through an arc of substantially 180°. A bracket 19 is fixed upon the base 11 and is similar in construction to the bracket 16.

The sprinkler pipe of the device is indicated by the numeral 20 and is fitted for angular adjustment about its axis, in the brackets 16 and 17 and at its opposite end in the bracket 19. A stud 21 upon the pipe projects into the slot 18 and serves not only to hold the pipe against slipping through the brackets in the direction of its length, but also to limit its angular adjustment. An upstanding ear 22 is fixed upon the base 11 at a point diametrically opposite the bracket 19 and a threaded stud 23 carried by the pipe 20 at its end opposite the end adjacent which the stud 21 is located, projects through an opening 24 in this ear 22 and a set nut 25 is threaded upon the stud 23 and bears against the said ear, this set nut serving as a means for holding the pipe at the desired angular adjustment. It is preferable that the ear 22 be formed with a right angularly extending portion 26 formed with an opening 27 through which may be secured one end of a pull rope or similar device by means of which the sprinkler may be drawn over the surface to be sprinkled, thus enabling the user of the device to sprinkle a large area without having to walk upon the sprinkled surface. The sprinkler pipe 20 is preferably formed from comparatively thin sheet metal blank so as to render the device inexpensive to manufacture and light in weight whereby it may be readily drawn over the surface to be sprinkled and in forming this pipe from the sheet metal blank, the pipe is so folded as to afford a reinforcing rib 28 extending from end to end of the pipe along its under side. At each end, the rib 28 is bent or folded against the pipe as at 29 so that the pipe, at its ends, is circular in cross section and will rotatably fit in the brackets 16, 17 and 19 provided for its support. It will be readily understood that inasmuch as the pipe is made from comparatively thin sheet metal, without the provision of the reinforcing rib 28, there would be a tendency of the pipe to bend or sag at some point between its ends, particularly in view of the weight of the water within the pipe. This rib, however, depending from the under side of the pipe and extending throughout substantially the entire length thereof, prevents such sagging or bending of the pipe. In its upper side, the pipe is formed with a plurality of series of openings indicated by the numeral 29'. Each series of openings extend spirally of the pipe and the series are so relatively located that the end opening of each series will be opposite the opening at the adjacent end of the next adjacent series, circumferentially. By thus arranging each series of openings and so relatively arranging the series, a plurality of streams of water will be ejected from the pipe and will strike the surface to be sprinkled at various distances from the pipe, the area to be sprinkled being thus evenly proportioned. Instead of forming the pipe 20 with a single reinforcing rib extending along its under side, its said under side may be formed with parallel ribs indicated by the numeral 30, as clearly shown in Fig. 6 of the drawings.

In Fig. 7 of the drawings there is shown a modified form of base and this form embodies an integral ear 31 which may be bent up to take the place of the apertured ear, previously described. At a point diametrically opposite this ear 31, the base is formed with an integral flange 32 which may be bent around the pipe to afford a bearing therefor.

From the foregoing description of the invention it will be seen that there is provided an extremely simple lawn sprinkler which may be drawn about over the surface of the lawn to be sprinkled and which will be inexpensive to manufacture and highly efficient in operation. It will further be understood that the sprinkler pipe may be readily adjusted to sprinkle a greater or less area at one time.

In order that a water supply hose may be readily connected to the sprinkler pipe, there is fitted in that end of the pipe opposite the end in which the threaded stud is located, a thimble 33 into which is fitted and secured a nipple 34 of a coupling 35 into which the male element of such a coupling, carried by the water supply hose, may be readily fitted.

What is claimed is:

In a lawn sprinkler, spaced bases, a perforated pipe supported at its ends between the bases for angular adjustment about its axis, one of the bases having an upstanding apertured bracket, a stud carried at one end of the pipe and engaging through the aperture in the bracket, a set nut threaded upon the stud and arranged to hold the pipe at angular adjustment, and means at the other end of the pipe for connection with a water supply hose.

In testimony that I claim the foregoing as my own, I have hereto affixed my signature in the presence of two witnesses.

WALTER ELLSWORTH EICHHOFF.

Witnesses:
J. C. EUBELL,
A. WRIGHT.

---

Copies of this patent may be obtained for five cents each, by addressing the "Commissioner of Patents, Washington, D. C."